(12) United States Patent
Pinnamraju et al.

(10) Patent No.: US 9,838,337 B1
(45) Date of Patent: Dec. 5, 2017

(54) AUTOMATIC VIRTUAL LOCAL AREA NETWORK (VLAN) PROVISIONING IN DATA CENTER SWITCHES

(71) Applicant: Juniper Networks, Inc., Sunnyvale, CA (US)

(72) Inventors: Pavan Ramesh Pinnamraju, Bangalore (IN); Jeelani Mahaboob Syed, Bangalore (IN); Rajeevalochan Ramaswamy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 136 days.

(21) Appl. No.: 14/502,379

(22) Filed: Sep. 30, 2014

(51) Int. Cl.
*H04L 12/931* (2013.01)
*H04L 12/947* (2013.01)
(Continued)

(52) U.S. Cl.
CPC ............ *H04L 49/25* (2013.01); *H04L 12/467* (2013.01); *H04L 12/4641* (2013.01);
(Continued)

(58) Field of Classification Search
CPC ......... H04L 45/00; H04L 45/44; H04L 45/56; H04L 45/745; H04L 12/467;
(Continued)

(56) References Cited

U.S. PATENT DOCUMENTS

| 5,892,912 A | * | 4/1999 | Suzuki | ................ H04L 12/4608 370/395.53 |
| 6,775,290 B1 | * | 8/2004 | Merchant | ............ H04L 12/4645 370/395.31 |

(Continued)

OTHER PUBLICATIONS

"Virtual PortChannel Quick Configuration Guide," Cisco Systems, Inc., 2009 (Applicant points out, in accordance with MPEP 609.04(a), that the year of publication, 2009, is sufficiently earlier than the effective U.S. filing date, Jan. 4, 2017 so that the particular month of publication is not in issue.) 9 pp.

(Continued)

*Primary Examiner* — Edan Orgad
*Assistant Examiner* — Ivan O Latorre
(74) *Attorney, Agent, or Firm* — Shumaker & Sieffert, P.A.

(57) ABSTRACT

Techniques are described for automatic provisioning of virtual local area networks (VLANs) on server-facing ports of access switches included in a data center network. Conventionally, VLANs are pre-configured on all server-facing ports of access switches. The techniques described in this disclosure enable automatic provisioning of VLANs on server-facing ports of access switches triggered by traffic received on the ports. The techniques include a feature in a forwarding plane of an access switch that is configured to detect data packets received for an unknown VLAN on a port, and notify a control plane of the access switch of the unknown VLAN on the port. In response to the notification from the forwarding plane, the control plane may authorize and provision the VLAN on the port. The techniques described in this disclosure include hardware-assisted software provisioning of an unknown VLAN on a given port of an access switch.

21 Claims, 5 Drawing Sheets

(51) Int. Cl.
    *H04L 12/741* (2013.01)
    *H04L 12/46* (2006.01)
    *H04L 29/06* (2006.01)
(52) U.S. Cl.
    CPC .......... *H04L 45/745* (2013.01); *H04L 49/354* (2013.01); *H04L 63/08* (2013.01); *H04L 12/4679* (2013.01); *H04L 63/0272* (2013.01)
(58) Field of Classification Search
    CPC . H04L 49/354; H04L 49/351; H04L 12/4641; H04L 12/4645–12/4695; H04L 63/0272; H04L 63/08; H04L 49/25
    USPC ..... 370/395.71, 392, 401, 412, 395.53, 390, 370/389, 241, 254, 395.31, 353; 709/238, 709/242
    See application file for complete search history.

(56) References Cited

U.S. PATENT DOCUMENTS

| | | | | |
|---|---|---|---|---|
| 7,619,966 | B2* | 11/2009 | Lee | H04L 12/462 370/218 |
| 7,664,110 | B1* | 2/2010 | Lovett | H04L 49/351 370/392 |
| 8,190,769 | B1* | 5/2012 | Shukla | H04L 12/4625 709/211 |
| 8,194,674 | B1* | 6/2012 | Pagel | H04L 12/4641 370/393 |
| 8,806,058 | B1 | 8/2014 | Mackie et al. | |
| 9,419,919 | B2 | 8/2016 | Goyal et al. | |
| 2003/0120763 | A1* | 6/2003 | Volpano | H04L 12/4641 709/223 |
| 2004/0250117 | A1* | 12/2004 | Congdon | H04L 63/105 726/13 |
| 2006/0002386 | A1* | 1/2006 | Yik | H04L 49/3063 370/389 |
| 2006/0007939 | A1* | 1/2006 | Elangovan | H04L 12/465 370/395.53 |
| 2007/0237148 | A1* | 10/2007 | Jabr | H04L 12/467 370/392 |
| 2008/0049621 | A1* | 2/2008 | McGuire | H04L 12/24 370/236.2 |
| 2008/0310421 | A1* | 12/2008 | Teisberg | H04L 12/4641 370/395.53 |
| 2009/0178119 | A1* | 7/2009 | Macauley | H04L 12/467 726/4 |
| 2010/0043068 | A1* | 2/2010 | Varadhan | H04L 12/4633 726/15 |
| 2010/0100611 | A1* | 4/2010 | Hatasaki | G06F 13/00 709/221 |
| 2010/0165877 | A1* | 7/2010 | Shukla | H04L 41/0843 370/254 |
| 2010/0223397 | A1* | 9/2010 | Elzur | H04L 41/0213 709/235 |
| 2010/0332615 | A1* | 12/2010 | Short | H04L 63/08 709/217 |
| 2011/0103259 | A1* | 5/2011 | Aybay | H04L 49/35 370/254 |
| 2011/0317699 | A1* | 12/2011 | Assarpour | H04L 12/4625 370/392 |
| 2012/0016973 | A1* | 1/2012 | Haris | H04L 49/00 709/220 |
| 2012/0117228 | A1* | 5/2012 | Gabriel | H04L 47/00 709/224 |
| 2012/0287936 | A1* | 11/2012 | Biswas | H04L 49/70 370/395.3 |
| 2013/0121321 | A1* | 5/2013 | Backes | H04L 12/4645 370/338 |
| 2013/0230047 | A1* | 9/2013 | Subrahmaniam | H04L 47/2441 370/392 |
| 2013/0242983 | A1* | 9/2013 | Tripathi | H04L 49/25 370/355 |
| 2014/0043964 | A1* | 2/2014 | Gabriel | H04L 41/5022 370/229 |
| 2014/0092901 | A1* | 4/2014 | Kapadia | H04L 45/745 370/390 |
| 2014/0241353 | A1* | 8/2014 | Zhang | H04L 45/74 370/390 |
| 2014/0269432 | A1 | 9/2014 | Goyal et al. | |
| 2014/0321470 | A1* | 10/2014 | Ookawa | H04L 45/08 370/395.53 |
| 2014/0376558 | A1* | 12/2014 | Rao | H04L 47/2441 370/401 |
| 2015/0103692 | A1* | 4/2015 | Jain | H04L 41/0806 370/254 |
| 2015/0271010 | A1* | 9/2015 | Shetty | H04L 41/0803 709/220 |
| 2016/0043950 | A1* | 2/2016 | Vobbilisetty | H04L 45/745 370/392 |

OTHER PUBLICATIONS

"How to Bring up 'Junos Fusion Enterprise' Dual Aggregated System," J-Net Community, retrieved from http://forums.juniper.net/t5/tkb/articleprintpage/tkb-id/Switching_TKB/article-id/25, on Sep. 15, 2016, 9 pp.

"Implementing Multi-Chassis Trunking on Brocade Netiron Platforms," IP Network Implementation Guide, Brocade Communications Systems, Inc. 2010 (Applicant points out, in accordance with MPEP 609.04(a), that the year of publication, 2010, is sufficiently earlier than the effective U.S. filing date, Jan. 4, 2017 so that the particular month of publication is not in issue.) 21 pp.

"Multi-Chassis Link Aggregation," Arista Networks, retrieved on Sep. 15, 2016, 3 pp.

U.S. Appl. No. 15/398,366, by Juniper Networks (Inventors: Thakor et al.), filed Jan. 4, 201.

* cited by examiner

VLAN TABLE — 60

| PORT NUMBER | VLAN TAG | VLAN INDEX |
|---|---|---|
| PORT A | VLAN1 | VLAN_ID1 | 61
| PORT A | VLAN2 | SHARED_VLAN | 62
| PORT B | VLAN1 | SHARED_VLAN | 63

FIG. 4

MAC TABLE — 64

| PORT NUMBER | VLAN INDEX | SOURCE MAC ADDRESS | STATE |
|---|---|---|---|
| PORT A | VLAN_ID1 | SMAC1 | FORWARDING | 65
| PORT A | VLAN_ID1 | SMAC2 | FORWARDING | 66
| PORT A | SHARED_VLAN | SMAC1 | LEARNING | 67
| PORT B | SHARED_VLAN | SMAC3 | LEARNING | 68

AUTOMATIC VIRTUAL LOCAL AREA NETWORK (VLAN) PROVISIONING IN DATA CENTER SWITCHES

TECHNICAL FIELD

The invention relates to computer networks and, more particularly, to data center networks.

BACKGROUND

A data center is a specialized facility that houses web sites and provides data serving and backup as well as other network-based services for subscribers. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

A data center switching architecture is used to provide subscribers and applications used by the subscribers with access to the web sites, data, and services housed in the data center. In some examples, the data center switching architecture comprises a multi-tiered architecture in which two or three tiers of Layer 2 switches are interconnected to aggregate data center traffic from servers and other devices in the data center to Layer 3 routers that communicate with other data centers or external networks. In other examples, the data center switching architecture may be flattened into a single tier of distributed access switches directly connected to one another across a fabric backplane to transmit traffic directly between servers, routers, and other devices connected to the access switches. The single tier fabric architecture can be managed as a single data center switch with distributed data and control planes across the components in the switch and a centralized management and configuration system.

SUMMARY

In general, the disclosure describes techniques for automatic provisioning of virtual local area networks (VLANs) on server-facing ports of access switches included in a data center network. Conventionally, VLANs are pre-configured on all server-facing ports of access switches in a data center network. The number of VLANs to be pre-configured on all of the access switch ports has grown significantly with the use of virtual machines (VMs) instantiated on physical servers and the transition from a multi-tiered data center architecture to a single layer data center fabric. The pre-configuring of so many VLANs may create resource consumption and scalability issues for the control planes of the access switches.

The techniques described in this disclosure enable automatic provisioning of VLANs on server-facing ports of access switches triggered by traffic received on the ports. The techniques include a feature in a forwarding plane of an access switch that is configured to detect data packets received for an unknown VLAN on a port, and notify a control plane of the access switch of the unknown VLAN on the port. In response to the notification from the forwarding plane, the control plane may authorize and provision the VLAN on the port. The techniques described in this disclosure include hardware-assisted software provisioning of an unknown VLAN on a given port of an access switch. In some example, the techniques may be similar to techniques used for source media access control (MAC) address learning for the provisioned VLAN on the port.

In one example, the techniques are directed to a method comprising receiving, on a port of an access switch in a data center network, a data packet for a VLAN from a server, the data packet including a VLAN tag identifying the VLAN and a source MAC address identifying the server; determining, at a forwarding plane of the access switch, whether the VLAN is provisioned on the port based on a VLAN table in the forwarding plane of the access switch; based on the VLAN not being provisioned on the port, sending a notification from the forwarding plane of the access switch to a control plane of the access switch; authorizing, at the control plane of the access switch, the VLAN for the port based on VLAN configuration information in the control plane of the access switch, and, upon authorization, provisioning, with the control plane of the access switch, the VLAN on the port of the access switch.

In another example, the techniques are directed to an access switch in a data center network, the access switch comprising a control unit including VLAN configuration information, and a forwarding engine including a VLAN table, and at least one port to receive a data packet for a VLAN from a server, the data packet including a VLAN tag identifying the VLAN and a source MAC address identifying the server. The forwarding engine is configured to determine whether the VLAN is provisioned on the port based on the VLAN table and, based on the VLAN not being provisioned on the port, send a notification to the control unit of the access switch. The control plane is configured to authorize the VLAN for the port based on the VLAN configuration information, and, upon authorization, provision the VLAN on the port of the access switch.

In a further example, the techniques are directed to a computer-readable storage medium comprising instructions that when executed cause one or more processors to receive, on a port of an access switch in a data center network, a data packet for a VLAN from a server, the data packet including a VLAN tag identifying the VLAN and a source MAC address identifying the server, determine, at a forwarding plane of the access switch, whether the VLAN is provisioned on the port based on a VLAN table in the forwarding plane of the access switch, based on the VLAN not being provisioned on the port, send a notification from the forwarding plane of the access switch to a control plane of the access switch, authorize, at the control plane of the access switch, the VLAN for the port based on VLAN configuration information in the control plane of the access switch; and upon authorization, provision, with the control plane of the access switch, the VLAN on the port of the access switch.

The details of one or more examples of this disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating an example virtual local area network (VLAN) table within a forwarding engine of an access switch.

FIG. 5 is a conceptual diagram illustrating an example media access control (MAC) table within a forwarding engine of an access switch.

DETAILED DESCRIPTION

Figure 1:
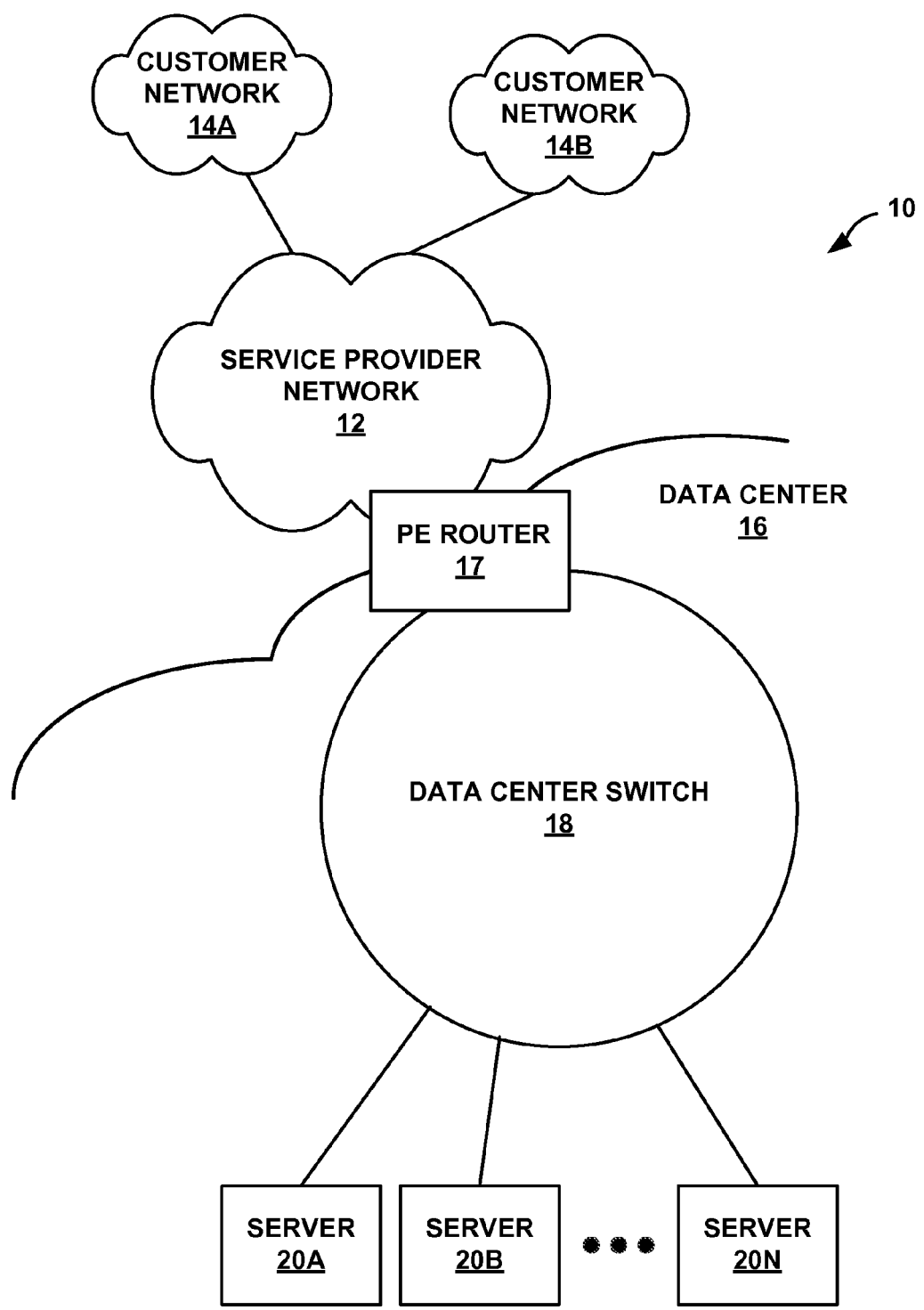
FIG. 1 is a block diagram illustrating an example network system including a data center with servers and a data center switch configured to provide connectivity between the servers and a service provider network.

FIG. 1 is a block diagram illustrating an example network system 10 including a data center 16 with servers 20A-20N ("servers 20") and a data center switch 18 configured to provide servers 20 with access to a service provider network 12, and with connectivity for server-to-server traffic within data center 16. Service provider network 12, in turn, provides customer networks 14A-14B ("customer networks 14") with access to web sites, data and services housed in servers 20.

Data center 16 is a facility that, in some examples, houses web sites and provides data serving and backup as well as other network-based services for end users in customer networks 14. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

In some examples, data center 16 may represent one of many geographically distributed network data centers. As illustrated in the example of FIG. 1, data center 16 may be a facility that includes servers 20 to provide resources for customer networks 14. Customer networks 14 may be collective entities such as enterprises and governments or individuals. For example, data center 16 could house web servers for several small businesses. Other exemplary services may include data storage, virtual private networks, traffic engineering, file service, data mining, scientific- or super-computing, and so on. In some embodiments, data center 16 may include individual network servers, network peers, or otherwise.

Service provider network 12 may be coupled to one or more networks (not shown) administered by other providers, and may thus form part of a large-scale public network infrastructure, e.g., the Internet. Service provider network 12, therefore, may provide end users in customer networks 14 with access to the Internet. In addition, service provider network 12 may provide data center 16 with access to the Internet, and may allow servers 20 within data center 16 to communicate with each other. Provider edge (PE) router 17 performs Layer 3 routing to route network traffic between data center 16 and customer networks 14 using service provider network 12. Service provider network 12 may include a variety of network devices other than PE router 17, such as other PE routers, core routers, customer edge (CE) routers, and switches.

Although additional network devices are not shown for ease of explanation, it should be understood that network system 10 may comprise additional networks and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 10 are illustrated as being directly coupled, it should be understood that one or more additional network elements may be included along any links between service provider network 12 and customer networks 14 and any links between data center switch 18 and servers 20, such that the network elements of computer system 10 are not directly coupled Data center 16 includes data center switch 18 to connect servers 20 to service provider network 12 via PE router 17. Data center switch 18 may include a plurality of access switches, e.g., top-of-rack (TOR) switches, interconnected via one or more distribution or core switches. In some examples, the architecture of data center switch 18 comprises a multi-tiered architecture in which two or three tiers of access switches and core switches are interconnected to aggregate data center traffic from servers 20 included in data center 16 to PE router 17 that communicates with service provider network 12 and/or other data centers.

In other examples, the architecture of data center switch 18 may be flattened into a single tier of distributed access switches directly connected to one another across a fabric backplane of distribution switches to transmit traffic directly between servers 20 and PE router 17 connected to the TOR switches. In the example of the single tier fabric architecture, data center switch 18 can be managed as a single switch with distributed data and control planes across the components in data center switch 18 and a centralized management and configuration system.

Data center switch 18 is generally described in this disclosure as conforming to the single tier fabric architecture. This example architecture of data center switch 18 is described in more detail with respect to FIG. 2. In other examples, however, data center switch 18 may conform to a different architecture, such a multi-tiered architecture or a different type of single tier architecture.

This disclosure describes techniques for automatic provisioning of virtual local area networks (VLANs) on server-facing ports of access switches included in data center switch 18. Conventionally, VLANs are pre-configured on all server-facing ports of access switches in data center switch 18. The number of VLANs to be pre-configured on all of the access switch ports has grown significantly with the use of virtual machines (VMs) instantiated on physical servers and the transition from the multi-tiered data center architecture to the single layer data center fabric. The pre-configuring of so many VLANs may create resource consumption and scalability issues for the control planes of the access switches. The techniques described in this disclosure enable automatic provisioning of VLANs on server-facing ports of access switches triggered by traffic received on the ports.

Figure 2:
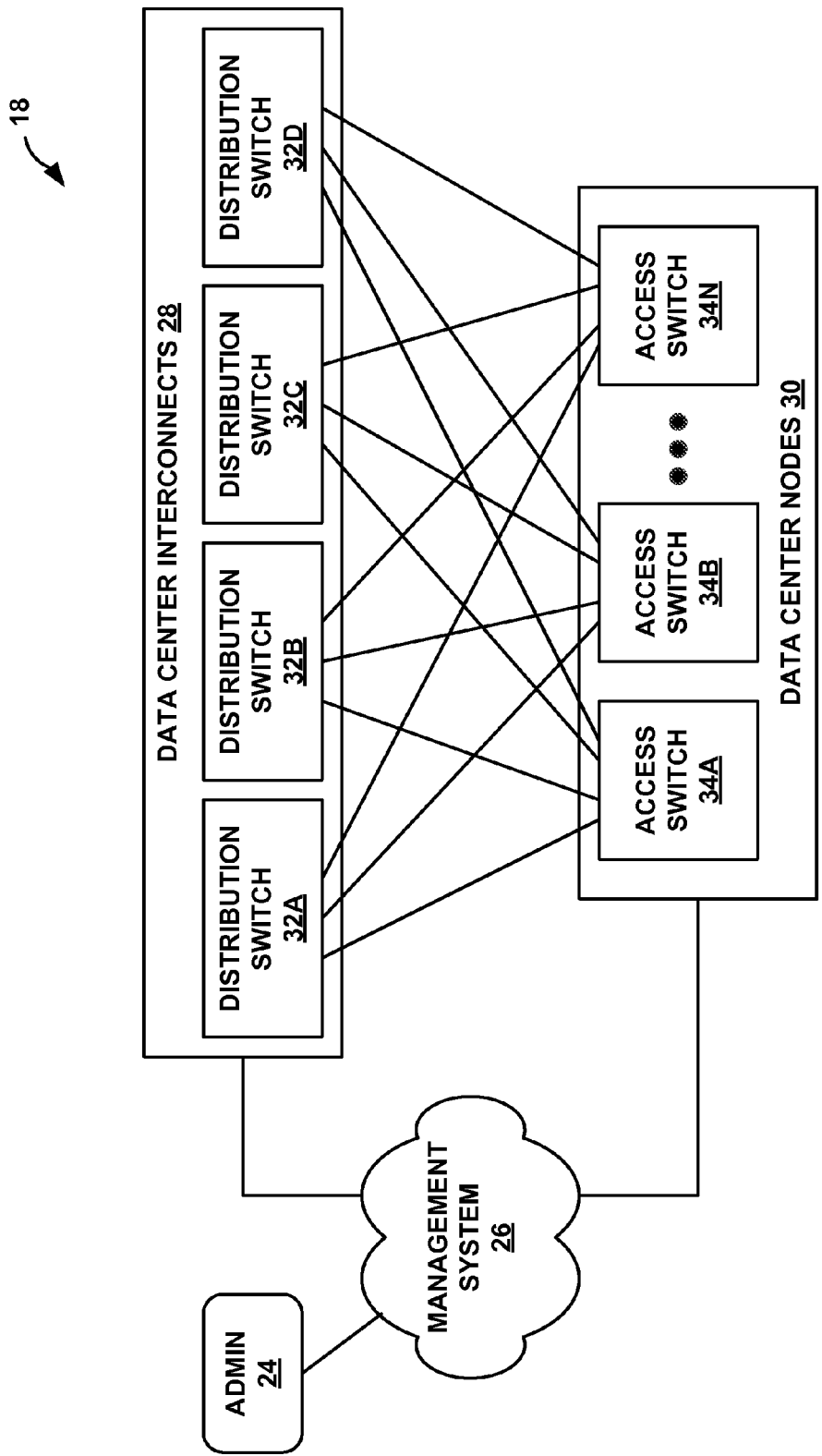
FIG. 2 is a block diagram illustrating an example of a data center switch including a centralized management system that configures components of the data center switch.

FIG. 2 is a block diagram illustrating an example of data center switch 18 including a centralized management system 26 to configure components of data center switch 18. Data center switch 18 conforms to a single tier fabric architecture that comprises a massively distributed system including up to hundreds of components. The architecture illustrated in FIG. 2 is merely exemplary and, in other examples, data center switch 18 may conform to a different architecture.

In the illustrated example, an administrator 24 interacts with components of data center switch 18 via centralized management system 26. Administrator 24 may comprise an individual, a team of individuals, an automated computer system or a semi-automated computer system. In some cases, administrator 24 may purely be a data center administrator responsible for configuration and monitoring of components in data center switch 18. In other cases, administrator 24 may also be a database administrator or a network administrator responsible for configuration and monitoring of routers, switches, servers, and other network devices external to data center switch 18.

In the example of FIG. 2, data center switch 18 includes data center nodes 30 interconnected via data center interconnects 28. Data center nodes 30 may comprise a plurality of access switches 34A-34N ("access switches 34"). For example, one or more of access switches 34 may be top-of-rack (TOR) switches. Data center interconnects 28 may comprise multiple distribution switches 32A-32D ("distribution switches 32"). In one example, in its full scale, data center switch 18 may include at least two director group nodes within management system 26, up to 128 access switches 34, up to four distribution switches 32, each containing up to eight front cards and two control boards, and up to two virtual chassis, each containing up to four control switches, to generate an out-of-band control plane network.

Access switches 34 form the access layer of data center switch 18 and provide networks devices, such as PE router 17 and servers 20 from FIG. 1, with access to the internal switch fabric of data center switch 18. The network devices may be connected to access switches 34 via a Gigabit Ethernet connection. Access switches 34 may provide layer 2 (MAC address) and/or layer 3 (IP address) switching functionality between the network devices.

In the illustrated example, each of access switches 34 is directly connected to each of distribution switches 32. Distribution switches 32 comprise the fabric interconnect backbone of data center switch 18 by providing layer 2 switching functionality to transfer data between connections of access switches 34. More specifically, each of distribution switches 32 includes front cards with multiple ports to receive and send data with access switches 34, and rear cards to transfer data between the front card ports. Distribution switches 32 may be connected to access switches 34 via a Gigabit Ethernet connection. Data en route from one network device to another, e.g., from PE router 17 to server 20A, may pass through one or more of access switches 34 and one or more of distribution switches 32.

Access switches 34 and distribution switches 32 include one or more processors capable of executing one or more software processes. For example, each of access switches 34 and distribution switches 32 may include a control unit and one or more packet forwarding engines (PFEs) (also referred to as "forwarding units"). The PFEs may be configured to switch packets from an input interface to an output interface of the switch using a switch fabric internal to the switch. For example, when access switch 34A receives a packet, an ingress PFE performs a lookup using forwarding information and forwards the network packet across an internal switch fabric of access switch 34A to an egress PFE of the switch. The egress PFE then forwards the network packet to a "next hop" device, which may be one of distribution switches 32 within data center switch 18 or a network device outside of data center switch 18 that is communicatively coupled to access switch 34A.

The single tier fabric architecture of data center switch 18 illustrated in FIG. 2 provides a highly distributed and interconnected system of switches that can be viewed by administrator 24 as a single switch. To achieve this, data center switch 18 includes data and control planes distributed across all components of switch 18, and centralized management system 26 through which administrator 24 can interact with any of the components of switch 18. More specifically, the routing and forwarding functionality of data center switch 18 is distributed across all access switches 34. For example, each of access switches 34 may perform routing operations by discovering its neighboring switches by sending hello messages, link state messages, broadcast messages or other routing protocol communications on each of its links to distribution switches 32. In addition, each of access switches 34 may execute a traffic distribution algorithm to determine traffic distribution across its links based on the discovered neighboring switches. In some cases, each of access switches 34 may share its routing information and traffic distribution with other components of data center switch 18 via the distributed control plane.

In order for administrator 24 to view the components of data center switch 18 as a single switch, the management and configuration processes for the components are centralized in management system 26. As illustrated in FIG. 2, management system 26 is connected to each of access switches 34 and distribution switches 32. In this way, administrator 24 can interact with any of the components in data center switch 18 to monitor, configure, or otherwise manage the components. For example, management system 26 may provide command line interface (CLI), simple network management protocol (SNMP), and system log functionality into data center switch 18 for administrator 24.

For example, access switches 34 or distribution switches 32 may receive network messages from management system 26 via SNMP. Upon receiving a network message, the managed component may provide information based on a monitoring request in the network message or modify its current configuration based on configuration data in the network message. For example, the monitoring request may ask the managed component to report its connectivity to other switches in data center switch 18 and/or the traffic distribution across its links. As another example, the configuration data may comprise a request to perform an update of the managed component.

Conventionally, in the illustrated single tier architecture, the configuration data may pre-configure virtual local area networks (VLANs) on all server-facing ports of access switches 34. Similarly, in the case of a multi-tier architecture (not shown), all server-facing ports of the access switches are pre-configured with all VLANs. In some cases, VLANs may be established for server-to-server traffic such that the VLANs terminate at the access switches of the data center. In this case, the VLANs may only need to be configured on the server-facing ports of the access switches. In other cases, the VLANs may be established for outgoing core network traffic such that the VLANs extend through the data center. In this case, the VLANs need to be configured on the switch-side ports of the access switches and on ports of aggregate switches in the case of a traditional three-layer architecture. For the switch-side ports, e.g., ports connecting access switches and/or aggregation switches within the data center switch, an inter-switch protocol like multiple VLAN registration protocol (MVRP) may be used to dynamically provision VLANs on the network-side ports of the access switches and on ports of the aggregation switches.

With the advent of virtual machines (VMs), the elasticity of a given VLAN spans across all access switches 34 in data center switch 18. In other words all VLANs in data center switch 18 should be provisioned on all access switches 34 because VMs can be instantiated on any physical server, e.g., any of servers 20 from FIG. 1. In addition to this increasing port density on access switches, collapsing the traditional three-layer architecture to a single-layer fabric solution (as illustrated in FIG. 2) puts a lot of burden (e.g., CPU cycles and memory resources) on a centralized control plane that needs to provision so many VLAN memberships on the ports. In the single-layer fabric, for each port that is pre-provisioned with VLANs, the state multiples exponentially. The pre-provisioning of so many VLANs is overkill for switching software because, in the end, only a few VLANs are active behind a given port. Hence, there is a need for dynamically adding VLANs on server-facing ports of access switches 34. On host-facing or server-facing ports, MVRP may not be an option in all scenarios, so there is a need for sensing VLANs when data packets arrive on the switch ports.

The techniques described in this disclosure enable automatic provisioning of VLANs on server-facing ports of access switches 34 triggered by traffic received on the ports of access switches 34. The techniques include a feature in a forwarding plane of access switch 34A, for example, configured to detect packets for an unknown VLAN on a port, and notify a control plane of access switch 34A of the unknown VLAN on the port. In response to the notification form the forwarding plane, the control plane may authorize and provision the VLAN on the port. The techniques described in this disclosure include hardware-assisted software provisioning of an unknown VLAN on a given port of access switch 34A. In some example, the techniques may be similar to techniques used for source Medium Access Control (MAC) address learning for the provisioned VLAN on the port.

Figure 3:
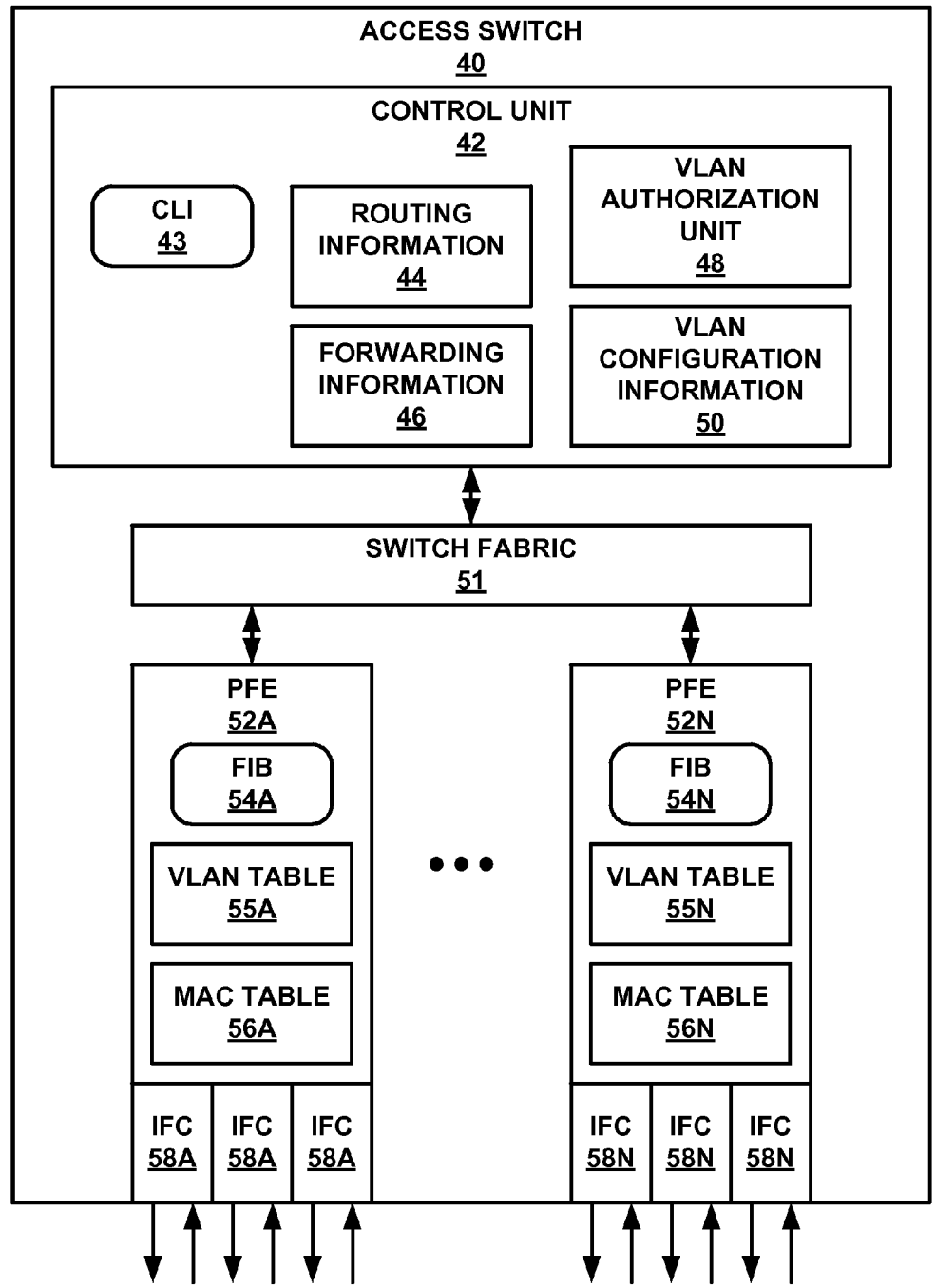
FIG. 3 is a block diagram illustrating an example of an access switch within a data center switch.

FIG. 3 is a block diagram illustrating an example of an access switch 40 within a data center switch, such as data center switch 18 from FIG. 1 and FIG. 2. As one example, access switch 40 may comprise an access switch connected to a plurality of other, similar access switches via a data center interconnect in a single-layer data center switch substantially similar to data center switch 18 from FIG. 2. As another example, access switch 40 may comprise an access switch positioned connected to a plurality of aggregate switches in a multi-tier data center switch. Regardless of the architecture of the data center switch, access switch 40 includes multiple server-facing ports connected to one or more servers, such as servers 20 from FIG. 1.

In the illustrated example of FIG. 3, access switch 40 includes a control unit 42 that provides control plane functionality for the network device. Access switch 40 also includes switch fabric 51 interconnecting a set of packet-forwarding engines 52A-52N ("PFEs 52") that send and receive traffic by a set of interface cards 58A-58N ("IFCs 58") that typically have one or more physical network interface ports. PFEs 52 and switch fabric 51 collectively provide a forwarding plane for forwarding network traffic. As shown in FIG. 3, each of PFEs 52 includes one of virtual local area network (VLAN) tables 55A-55N ("VLAN tables 55") that identifies VLAN indexes for VLANs on ports of IFCs 58. Each of PFEs 52 also includes one of Media Access Control (MAC) tables 56A-56N ("MAC tables 56") that identifies source MAC addresses for VLANs on ports of IFCs 58. Each of VLAN tables 55 and MAC tables 56 are maintained by the respective PFEs 52 in the transport layer and are not distributed in IFCs 58 on a per port basis. In addition, each of PFEs 52 includes one of forwarding information bases (FIBs) 54A-54N ("FIBs 54") that stores forwarding data structures installed by control unit 42. Although not shown in FIG. 3, PFEs 52 may each comprise a central processing unit (CPU), memory and one or more programmable packet-forwarding application-specific integrated circuits (ASICs). Switch fabric 51 provides a high-speed interconnect for packet switching and forwarding incoming data packets between PFEs 52 for transmission over a network.

Control unit 42 provides an operating environment for various protocols that perform control plane functions for access switch 40. For example, control unit 42 may include one or more control and routing protocols such as border gateway protocol (BGP), internal gateway protocol (IGP), label distribution protocol (LDP) and/or resource reservation protocol (RSVP). In some examples, the IGP may comprise the open shortest path first (OSPF) protocol or the intermediate system-to-intermediate system (IS-IS) protocol. Control unit 42 also may include one or more daemons that comprise user-level processes that run network management software, execute routing protocols to communicate with peer routers or switches, maintain and update one or more routing tables, and create one or more forwarding tables for installation to PFEs 52, among other functions.

As one example, control unit 42 includes a command-line interface ("CLI") 43. CLI 43 provides a shell by which an administrator, such as administrator 24 from FIG. 2, may modify the configuration of access switch 40 using text-based commands. In accordance with techniques described in this disclosure, the administrator may configure VLAN configuration information 50 defined to identify which VLANs are expected on which interface ports of access switch 40. Control unit 42 receives VLAN configuration information 50 from the administrator via CLI 43, and installs VLAN configuration information 50 in a data structure. In other examples, VLAN configuration information 50 may instead be provided to control unit 42 via a network management system (NMS) or a software-defined network (SDN) controller.

As another example, a routing protocol daemon (RPD) (not shown) may use one of the routing protocols included in control unit 42 as a link state routing protocol to advertise a topology of the network. Control unit 42 maintains routing information 44 that defines routes to destinations within the network and topology data that represents the overall topology of the network. Routing information 44 may include, for example, route data that describes various routes within the network, and corresponding next hop data indicating appropriate neighboring devices within the network for each of the routes. Access switch 40 updates routing information 44 based on received advertisements to accurately reflect the topology of the network. Based on routing information 44, control unit 42 generates forwarding information 46 and installs forwarding data structures into FIBs 54 within PFEs 48 in the forwarding plane. FIBs 54 associate network destinations with specific next hops and corresponding interface ports within the forwarding plane.

Control unit 42 of access router 40 may also include one or more daemons (not shown) that identify individual programs for compilation and instantiation as forwarding data structures in FIBs 54 to perform forwarding plane functionality of access switch 40. The programs may specify functions to be performed on the packet, including fundamental packet forwarding operations such as input packet processing, route lookup, and output packet processing, as well as service functions such as packet filtering or access control, statistical sampling, traffic policing, rate limiting, and accounting. The daemons select the appropriate forwarding data structures for installation in FIBs 54 of PFEs 52 to establish packet forwarding paths and provide lookup data.

Additional information regarding packet forwarding path programming is available in PACKET FORWARDING PATH PROGRAMMING USING A HIGH-LEVEL DESCRIPTION LANGUAGE, U.S. application Ser. No. 13/194,571, filed Jul. 29, 2011, which is incorporated herein by reference in its entirety.

In the example of FIG. 3, control unit 42 is connected to each of PFEs 52 by a dedicated internal communication link and switch fabric 51. For example, the dedicated link may comprise a 200 Mbps or Gigabit Ethernet connection for internal communication between the multiple components of access switch 40. In one embodiment, control unit 42 communicates data representative of FIBs 54 into PFEs 52 to program the PFEs 52 and thereby control forwarding of traffic by the corresponding components within the forwarding plane. This allows FIBs 54 stored in memory (e.g., on-chip RAM) in PFEs 52 to be updated without degrading packet-forwarding performance of access switch 40. In some instances, control unit 42 may derive a separate and different one of FIBs 54 for each of the respective PFEs 52. In addition, one or more of PFEs 52 may include packet-forwarding ASICs (not shown in FIG. 3) that PFEs 52 program with a hardware-copy FIB based on the one of FIBs 54 (i.e., hardware versions of the software FIBs) in each of the respective PFEs 52.

PFEs 52 process packets by performing a series of operations on each packet over respective internal packet forwarding paths as the packets traverse the internal architecture of access switch 40. Operations may be performed, for example, on each packet by any of a corresponding ingress interface port, an ingress one of PFEs 52, an egress one of PFEs 52, an egress interface port or other components of access switch 40 to which the packet is directed prior to egress. PFEs 52 each include forwarding data structures within FIBs 52 that, when executed, examine the contents of each packet and on that basis make forwarding decisions, apply filters, and/or perform accounting, management, traffic analysis, and load balancing, for example. The result of packet processing determines the manner in which a packet is forwarded or otherwise processed by PFEs 52 from its ingress interface port on one of IFCs 58 to its egress interface port on one of IFCs 58.

The techniques described in this disclosure enable automatic provisioning of VLANs on the server-facing ports on IFCs 58 of access switch 40 triggered by traffic received on the ports. According to the techniques, each of PFEs 52 of access switch 40 are further configured to detect data packets received for an unknown VLAN on a given port on one of IFCs 58, and notify control unit 42 of access switch 40 of the unknown VLAN on the port. In response to the notification from one of PFEs 52, control unit 42 performs authorization and provisioning of the VLAN on the given port. The techniques described in this disclosure include hardware-assisted (i.e., forwarding plane-assisted) software provisioning of an unknown VLAN on a given port of access switch 40. As described in more detail below, the techniques may be similar to techniques used for source MAC address learning for the provisioned VLAN on the port.

As an example, access switch 40 receives a data packet on a port on IFCs 58A of PFE 52A from a server, such as one of server 20 from FIG. 1. PFE 52A determines a source MAC address and a VLAN tag included in a packet header of the data packet. The VLAN tag identifies the VLAN of the data packet, and the source MAC address identifies the server from which the data packet was received. Conventionally, all VLANs are pre-configured on all server-facing ports of an access switch such that, prior to performing packet switching, a forwarding engine only needs to lookup a source MAC address of a received data packet to determine if the source MAC address is known or needs to be learned for the VLAN on the port.

According to the techniques described in this disclosure, the VLANs are not pre-configured on the server-facing ports of access switch 40. In this case, prior to performing packet switching, PFE 52A is configured to perform VLAN classification based on VLAN table 55A in order to recognize whether the VLAN for the received packet is provisioned on the receiving port. VLAN table 55A is a centralized hash table with entries that include port numbers, VLAN tags, and associated VLAN indexes assigned to VLANs that are provisioned on the ports on IFCs 58A of PFE 52A. To perform VLAN classification based on a received data packet, the lookup keys into VLAN table 55A are the port number of the receiving port and the VLAN tag identified in the packet header.

Upon receiving the data packet on the port on IFCs 58A of PFE 52A, PFE 52A first looks up the VLAN tag of the received data packet in VLAN table 55A to determine whether the VLAN is provisioned on the receiving port. For example, PFE 52A may determine whether the VLAN is provisioned on the receiving port by performing a lookup in VLAN table 55A based on the VLAN tag and the port number of the receiving port. Based on VLAN table 55A having no entries for the VLAN tag and the port number, PFE 52A may classify the VLAN as not being provisioned on the port.

If the VLAN is not provisioned on the receiving port, then PFE 52A triggers the VLAN auto-provisioning operation in access switch 40, in according with the techniques described in this disclosure. PFE 52A maps the VLAN tag to a shared VLAN index for all unknown VLANs on the port, and installs an entry into VLAN table 55A that includes the VLAN tag, the port number of the receiving port, and the shared VLAN index. PFE 52A then performs a lookup in MAC table 56A based on the shared VLAN index and the source MAC address. PFE 52A installs an entry into MAC table 56A that includes the shared VLAN index, the source MAC address, and the port number of the receiving port. MAC table 56A is a centralized hash table with entries that include port numbers, VLAN indexes, and MAC addresses that are known on the ports on IFCs 58A of PFE 52A.

Similar to source MAC address learning techniques, the installed entry in MAC table 56A stops PFE 52A from sending additional notifications to control unit 42 based on subsequent data packets received for an unknown VLAN on the same port with the same source MAC address. In addition, similar to source MAC address learning techniques, PFE 52A may set a learning state bit for the installed entry in MAC table 56A, which causes PFE 52A to drop the subsequent data packets received for an unknown VLAN on the same port with the same source MAC address. These re-purposed source MAC address techniques are described in more detail below.

The installed entry in MAC table 56A also triggers PFE 52A to send either the data packet itself or another message to notify control unit 42 of access switch 40 that the VLAN of the received data packet is not provisioned on the receiving port. Upon receiving the notification from PFE 52A, VLAN authorization unit 48 in control unit 42 attempts to authorize the VLAN for the port using VLAN configuration information 50. As discussed above, an administrator may configure VLAN configuration information 50 via CLI 43 to identify the expected VLANs on each of the ports of access switch 40. According to the techniques described in this disclosure, control unit 42 of access switch 40 knows which VLANs should be seen on a given port, but does not pre-configure all the VLANs on every port. Instead, control unit 42 waits to receive a notification from one of PFEs 52 that a given VLAN is being used on a given port, and then authorizes and configures the given VLAN on the given port.

VLAN authorization unit 48 may compare the VLAN tag included in the received packet to VLAN configuration information 50 to determine whether the VLAN for the received packet is expected on the receiving port. If, based on VLAN configuration information 50, the VLAN for the received data packet is expected on the receiving port, VLAN authorization unit 48 authorizes the VLAN for the receiving port. On the other hand, if the VLAN is not expected on the receiving port, the VLAN will not be authorized and will not be provisioned on the receiving port.

Upon authorizing the VLAN for the received packet, control unit 42 provisions the VLAN on the receiving port on IFCs 58A of PFE 52A. For example, control unit 42 programs forwarding information for the VLAN on the receiving port into FIB 54A of PFE 52A. In addition, control unit 42 enables source MAC address learning for the provisioned VLAN on the receiving port. For example, upon provisioning the VLAN on the receiving port, PFE 52A updates the entry in VLAN table 55A with the actual VLAN index for the provisioned VLAN. In this way, a subsequent data packet received for the same VLAN on the same port will be classified using VLAN table 55A as being for a known or provisioned VLAN with an assigned VLAN index, and a new entry may be created in MAC table 56A using the actual VLAN index and the source MAC address included in the subsequent data packet. PFE 52A may then perform a source MAC address lookup in MAC table 56A based on the source MAC address included in the subsequent data packet and the assigned VLAN index, and perform packet switching for the subsequent data packet.

During provisioning of the VLAN on the receiving port, control unit 42 may also initialize VLAN aging to determine when to remove the programmed forwarding information for the VLAN on the port from FIB 54A of PFE 52A when data packets for the VLAN are not received for a period of time. As one example, upon provisioning the VLAN on the receiving port, control unit 42 may initialize age-out timers for source MAC addresses learned for the VLAN on the port. In this way, each of the source MAC addresses learned for the VLAN on the port may age-out individually when data packets are not received from the respective source MAC address for a period of time. When all of the source MAC addresses for the VLAN on the port have aged-out, control unit 42 initializes a VLAN age-out delay timer, and unprovisions the VLAN on the port after expiration of the VLAN age-out delay timer. The age-out timers for the source MAC addresses and the VLAN age-out delay timer may be configurable, but typically will be set to very high numbers. As an example, the age-out timers for the source MAC addresses may be set to 300 seconds, and the VLAN age-out delay timer may be set to a 300 second delay. When the VLAN is unprovisioned at the expiration of the VLAN age-out delay timer, control unit 24 may remove the programmed forwarding information for the VLAN from FIB 54A of PFE 52A.

In general, control unit 42 of access switch 40 manages the source MAC address and VLAN age-out timers. In one example, PFEs 52 may inform control unit 42 when traffic for the different VLANs and from the different source MAC addresses is received so that control unit 42 knows when to initialize the age-out timers. In another example, control unit 42 may take traffic samples periodically, e.g., every ten seconds, to determine which source MAC addresses have received traffic (i.e., set a hit-bit). If control unit 42 does not see a hit-bit for a given source MAC address over several samples, then control unit 42 may initialize the age-out timer for the given source MAC address. In either example, control unit 42 knows when to initialize the source MAC address age-out timers and, once all the source MAC addresses for a given VLAN have aged-out, control unit 42 may initialize the VLAN age-out delay timer. If no data packets are received for the VLAN on the port before the expiration of the VLAN age-out delay timer, control unit 42 may unprovision the VLAN on the port.

The VLAN auto-provisioning operation described in this disclosure is a feature that enables a VLAN to be provisioned on a given ports when data for the VLAN is received on the given port for the first time. This type of VLAN provisioning needs hardware (e.g., PFEs 52) assisted software provisioning similar to source MAC address learning. One required feature in any forwarding engine assisted learning mechanism (e.g., source MAC address or VLAN) is to throttle subsequent packets that would re-trigger the learn event until the software (e.g., control unit 42) processes the current learn event and programs the source MAC address or the VLAN in PFEs 52. Typical network chips that support source MAC address learning provide this mechanism by installing a source MAC address entry in a MAC table (e.g., MAC tables 56) automatically and sending a learn event to control unit 42 for further processing.

While control unit 42 is processing the source MAC address learn event, all the subsequent packets received from the same source MAC address do not trigger new learn events. The learn event that PFE 52A, for example, sends may be a specialized learn notification message with packet fields that are of interest or the data packet itself. This mechanism prevents PFE 52A from storming the CPU with data packets and learn events from the same source MAC address while control unit 42 is busy processing the current learn event. In addition to learning source MAC address entries in MAC table 56A, PFE 52A may also set a learning state bit called hw-learnt-bit for these entries in MAC table 56A. This learning state bit indicates that control unit 42 is yet to process this source MAC address entry and make it a permanent source MAC address entry in MAC table 56A. The hw-learnt-bit is used to define the forwarding behavior for subsequently received packets from the same source MAC address while control unit 42 is learning the source MAC address entry, and also to recover the source MAC address in case the learn event is dropped. This recovery mechanism is very important in data plane learning mechanisms to handle traffic bursts.

To implement the VLAN auto-provisioning feature described in this disclosure in software (e.g., control unit 42), similar hardware (e.g., PFEs 52) support may be necessary. The techniques described in this disclosure repurpose the source MAC address learning mechanisms described above in order to trigger VLAN learn events based on traffic received for unprovisioned VLANs. According to the techniques, PFEs 52 map all unknown VLANs for a port (i.e., VLANs that are yet to be provisioned on the port) into a shared VLAN index, and use similar source MAC address learn events for the shared VLAN index to detect the unknown VLANs. Typically, the source MAC address learning support in PFEs 52 has these configuration knobs: send-learnt-packets-to-cpu or send-learn-notifications, drop-pktsfor-hw-learnt-entries or forward-pkts-for-hw-learnt-entries. For the VLAN auto-provisioning feature, the learning configuration may be set to include the followng: send-learnt-packets-to-cpu to get the actual VLAN tag for the received packet, and drop-pkts-for-hw-learn-entries to ensure the packets are forwarded after the VLAN is properly provisioned on the port of access switch 40.

Mapping of all unknown VLANs to a shared VLAN index may be done using a filter mechanism during the VLAN classification performed by PFEs 52. For example, if PFE 52A determines that the VLAN for the received packet is classified as not being provisioned, i.e., a classification failure condition, then PFE 52A maps the unknown VLAN to the shared VLAN index. A known drawback with the above classification and mapping technique is that for a given source MAC address, e.g., SMAC1, all VLANs will be learned in a sequential manner based on the order in which the packets for the VLANs were received on the port.

For example, if PFE 52A first received a data packet for (VLAN1, SMAC1) and then received a data packet for (VLAN2, SMAC1) on the same port, unknown VLAN1 and VLAN2 would both be mapped to the same shared VLAN index on the same port and from the same source MAC address. In this case, the data packet for (VLAN2, SMAC1) would be dropped based on the entry in MAC table 52A for (shared VLAN, SMAC1) on the same port, which was created based on the first received data packet (VLAN1, SMAC1). In this case, VLAN2 may not be classified, authorized and provisioned until after VLAN1 has been provisioned completely to the port on PFE 52A. The case of the same source sending traffic for two different VLANs occurs rarely, and the above limitation is minor compared to the advantages this technique brings to the VLAN auto-provisioning feature.

In some cases, the techniques described in disclosure may also be used for tunneled VLANs that include nested VLAN tags to identify customer VLANs (CVLANs) and service VLANs (SVLANs) for a given packet, referred to as Q-in-Q. For example, during VLAN classification, PFEs 52 may map unprovisioned C-VLANs or unprovisioned S-VLAN/C-VLAN pairs to a shared VLAN index as described above. Although tunneled VLANs are not common in data center networks, the same techniques may be used to configure the combination of VLANs for the received data packet.

The technique described in this disclosure enables support of VLAN auto-provisioning in a scalable way on a single-layer data center fabric solution. Going forward, this technique may also open up opportunities to cut down a lot of static configuration on access switch 40 for pre-provisioning VLAN on ports, which is a huge amount of configuration considering the number of VLANs and ports. Instead, any static configuration on access switch 40 may be reduced to configuring service profiles on ports with valid VLAN ranges and other service level attributes.

The architecture of ingress router 40 illustrated in FIG. 3 is shown for exemplary purposes only. The disclosure is not limited to this architecture. In other embodiments, ingress router 40 may be configured in a variety of ways. In one embodiment, for example, some of the functionally of control unit 42 may be distributed within PFEs 48. The operating environment of control unit 42 may be implemented solely in software, or hardware, or may be implemented as a combination of software, hardware or firmware. For example, control unit 42 may include one or more processors, one or more microprocessors, digital signal processors (DSPs), application specific integrated circuits (ASICs), application specific special processors (ASSP), field programmable gate arrays (FPGAs), or any other equivalent integrated or discrete logic circuitry, or any combination thereof, which execute software instructions. In that case, control unit 42 may include various software modules or daemons executing on an operating system, and may include executable instructions stored, embodied, embedded, or encoded in a non-transitory computer-readable storage medium, such as computer memory or hard disk. Instructions stored in a computer-readable medium may cause a programmable processor, or other processor, to perform methods described herein, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of ingress router 40, e.g., protocols. Control unit 42, in some examples, retrieves and executes the instructions from memory for these aspects.

FIG. 4 is a conceptual diagram illustrating an example VLAN table 60 within a forwarding engine of an access switch. In some examples, VLAN table 60 may operate substantially similar to VLAN tables 55 within PFEs 52 of access switch 40 from FIG. 3. As illustrated in FIG. 4, VLAN table 60 includes multiple entries 61, 62 and 63, with each of the entries including a port number and a VLAN tag associated with a received packet. In addition, VLAN table 60 includes a VLAN index for each entry.

As one example, entry 61 includes a port number of Port A, a VLAN tag of VLAN1, and an associated VLAN index of VLAN_ID1. In this example, VLAN1 is provisioned on Port A. Upon receiving a data packet for VLAN1 on Port A, a lookup is performed in VLAN table 60 based on the VLAN1 tag for Port A. According to entry 61, the lookup is successful and VLAN1 is classified as provisioned on Port A with the associated VLAN index of VLAN_ID1. The VLAN index VLAN_ID1 is then used with a source MAC address included in the received data packet to perform a further lookup in a MAC table, such as MAC tables 56 from FIG. 3 or MAC table 64 from FIG. 5, to perform packet switching of the received data packet.

As another example, entry 62 includes a port number of Port A, a VLAN tag of VLAN2, and an associated VLAN index of shared_VLAN. In this example, VLAN2 is not provisioned on Port A. Upon receiving a data packet for VLAN2 on Port A, a lookup is performed in VLAN table 60 based on the VLAN2 tag for Port A, and the lookup fails. When the lookup in VLAN table 60 fails, unknown VLAN2 is classified as not provisioned on Port A and is mapped to the shared_VLAN index for all unknown VLANs on Port A. The forwarding engine of the access switch installs entry 62 in VLAN table 60. The VLAN index shared_VLAN is then used to perform a further lookup in a MAC table, such as MAC tables 56 from FIG. 3 or MAC table 64 from FIG. 5, to trigger auto-VLAN provisioning of unknown VLAN2 on Port A.

As a further example, entry 63 includes a port number of Port B, a VLAN tag of VLAN1, and an associated VLAN index of shared_VLAN. In this example, although already provisioned on Port A, VLAN1 is not provisioned on Port B. Upon receiving a data packet for VLAN1 on Port B, a lookup is performed in VLAN table 60 based on the VLAN1 tag for Port B, and the lookup fails. When the lookup in VLAN table 60 fails, unknown VLAN1 is classified as not provisioned on Port B and is mapped to the shared_VLAN index for all unknown VLANs on Port B. The forwarding engine of the access switch installs entry 63 in VLAN table 60. The VLAN index shared_VLAN is then used to perform a further lookup in a MAC table, such as MAC tables 56 from FIG. 3 or MAC table 64 from FIG. 5, to trigger auto-VLAN provisioning of unknown VLAN1 on Port B.

FIG. 5 is a conceptual diagram illustrating an example MAC table 64 within a forwarding engine of an access switch. In some examples, MAC table 64 may operate substantially similar to MAC tables 56 within PFEs 52 of access switch 40 from FIG. 3. As illustrated in FIG. 5, MAC table 64 includes multiple entries 65, 66, 67 and 68, with each of the entries including a port number, a VLAN index and a source MAC address associated with a received packet. In addition, MAC table 64 includes a state for each entry. The VLAN index is associated with a VLAN tag for the received packet and is assigned during VLAN classification, which is performed by the forwarding engine of the access switch using a VLAN table, such as VLAN tables 55 from FIG. 3 or VLAN table 60 from FIG. 4.

In the illustrated example of FIG. 5, MAC table 64 uses the "forwarding" state to indicate that a VLAN to which a given source MAC address belongs is provisioned on a given port. MAC table 64 uses the "learning" state to indicate that an unknown VLAN to which a given source MAC address belongs has been detected on a given port by the forwarding engine of the access switch, and VLAN auto-provisioning is currently being performed for the unknown VLAN on the given port by a control unit of the access switch.

As one example, entry 65 includes a port number of Port A, a VLAN index of VLAN_ID1, and a source MAC address of SMAC1 categorized as "fowarding." In this example, SMAC1 belongs to VLAN1, and VLAN1 is provisioned on Port A and assigned VLAN_ID1 (see entry 61 in VLAN table 60). In some cases, SMAC1 may be a known source MAC address for VLAN_ID1 on Port A, having been learned on the shared_VLAN index during the auto-provisioning of VLAN1 on Port A. In this case, any packets received for VLAN_ID1 on Port A from the server with SMAC1 will be immediately forwarded toward its destination according to forwarding information in the forwarding engine of the access switch.

As another example, entry 66 includes a port number of Port A, a VLAN index of VLAN_ID1, and a source MAC address of SMAC2 categorized as "forwarding." In this example, SMAC2 belongs to VLAN1, and VLAN1 is provisioned on Port A and assigned VLAN_ID1 (see entry 61 in VLAN table 60). In some cases, SMAC2 may be an unknown source MAC address for VLAN_ID1 on Port A. In this case, the control unit of the access switch is notified that SMAC2 is unknown and performs source MAC address learning for VLAN_ID1 on Port A. While the source MAC address learning is performed, any subsequent packets received for VLAN_ID1 on Port A from the server with SMAC2 will be dropped and no additional notifications will be sent to the control unit of the access switch.

As a further example, entry 67 includes a port number of Port A, a VLAN index of shared_VLAN, and a source MAC address of SMAC1 categorized as "learning." In this example, another VLAN, e.g., VLAN2, to which SMAC1 belongs, is not provisioned on Port A (see entry 62 in VLAN table 60). According to the techniques described in this disclosure, when the lookup in VLAN table 60 fails, unknown VLAN2 on Port A is mapped to the shared_VLAN index for all unknown VLANs on Port A, and a further lookup in MAC table 64 is performed based on the shared_VLAN index for Port A and SMAC1. During the lookup in MAC table 64, the forwarding engine of the access switch installs entry 67 in MAC table 64, and notifies the control unit of the access switch that VLAN2 is not provisioned on Port A. The control unit of the access switch then performs auto-VLAN provisioning of VLAN2 on Port A.

While the auto-VLAN provisioning is performed, any subsequent packets received for any unknown VLANs on Port A from the server with SMAC1 will be dropped and no additional notifications will be sent to the control unit of the access switch. For example, if a data packet for any unknown VLAN is received on Port A from the server with SMAC1, the data packet would be dropped based on entry 67 in MAC table 64 because all unknown VLANs on the same port are mapped to the same shared_VLAN index. In this example, VLAN2 would need to be fully provisioned on Port A before another unknown VLAN could be learned on Port A for packets from the server with SMAC1. Once VLAN2 is authorized and provisioned on Port A, entry 62 in VLAN table 60 may be updated with the actual VLAN index of VLAN2 on Port A, and a new entry may be created in MAC table 64 during a subsequent source MAC table lookup using the actual VLAN index of VLAN2 on Port A.

As another example, entry 68 includes a port number of Port B, a VLAN index of shared_VLAN, and a source MAC address of SMAC3 categorized as "learning." In this example, a VLAN, e.g., VLAN1, to which SMAC3 belongs, is not provisioned on Port B (see entry 63 in VLAN table 60). According to the techniques described in this disclosure, when the lookup in VLAN table 60 fails, unknown VLAN1 on Port B is mapped to the shared_VLAN index for all unknown VLANs on Port B, and a further lookup in MAC table 64 is performed based on the shared_VLAN index for Port B and SMAC3. During the lookup in MAC table 64, the forwarding engine of the access switch installs entry 68 in MAC table 64, and notifies the control unit of the access switch that VLAN 1 is not provisioned on Port B. The control unit of the access switch then performs auto-VLAN provisioning of VLAN1 on Port B.

While the auto-VLAN provisioning is performed, any subsequent packets received for any unknown VLANs on Port B from the server with SMAC3 will be dropped and no additional notifications will be sent to the control unit of the access switch. For example, if a data packet for any unknown VLAN is received on Port B from the server with SMAC3, the data packet would be dropped based on entry 68 in MAC table 64 because all unknown VLANs on the same port are mapped to the same shared_VLAN index. In this example, VLAN1 would need to be fully provisioned on Port B before another unknown VLAN could be learned on Port B for packets from the server with SMAC3. Once VLAN1 is authorized and provisioned on Port B, entry 63 in VLAN table 60 may be updated with the actual VLAN index of VLAN1 on Port B, and a new entry may be created in MAC table 64 during a subsequent source MAC table lookup using the actual VLAN index of VLAN1 on Port B.

Figure 6:
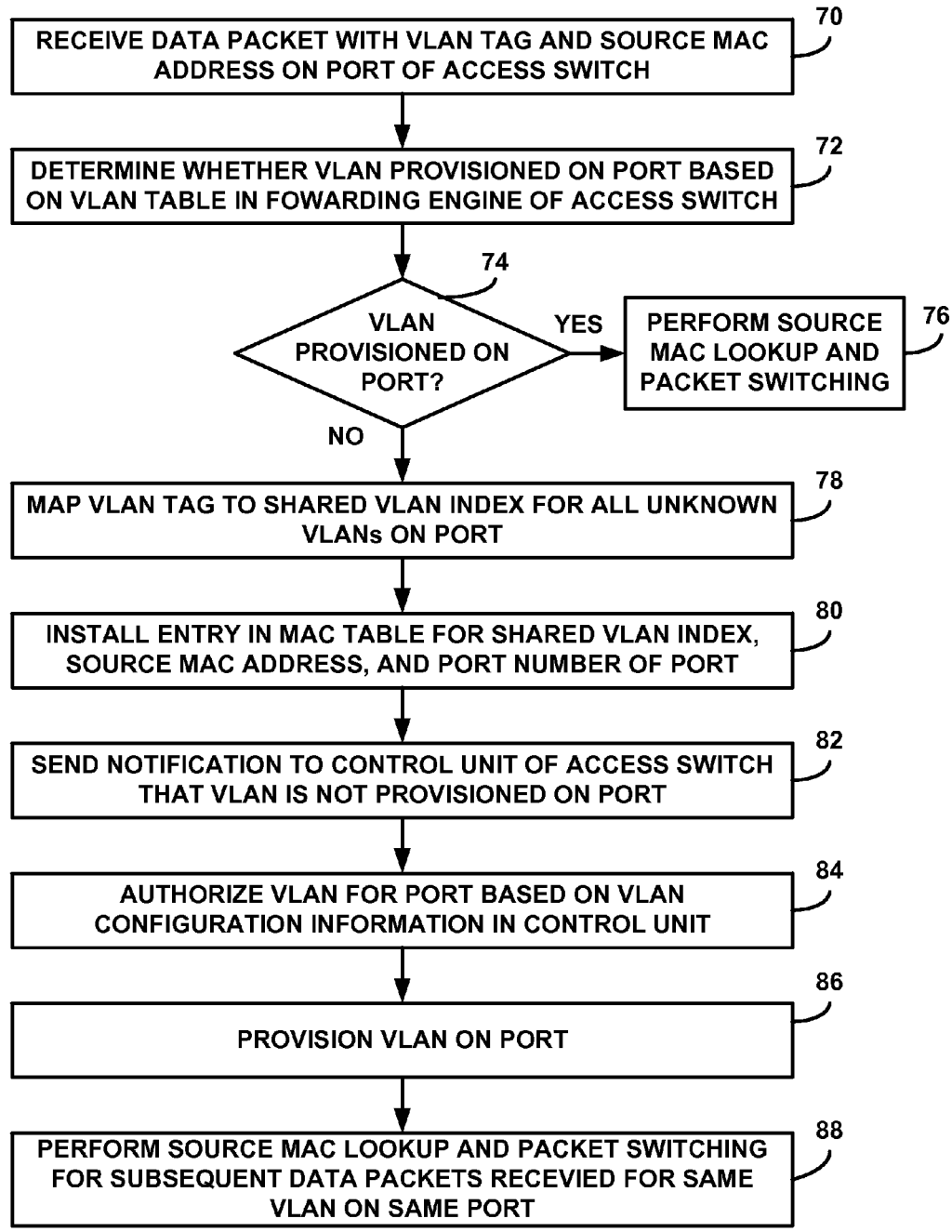
FIG. 6 is a flow chart illustrating an example operation of automatically provisioning VLANs on access switch ports in a data center network.

FIG. 6 is a flowchart illustrating an example operation of automatically provisioning VLANs on access switch ports in a data center network. The example operation is described herein with reference to access switch 40 from FIG. 3. In other examples, the operation may be performed by any of access switches 34 in data center switch 18 from FIG. 2.

A port on PFE 52A in access switch 40 receives a data packet for a VLAN from a server including a VLAN tag and a source MAC address (70). The VLAN tag identifies the VLAN of the data packet, and the source MAC address identifies the server from which the data packet was received. PFE 52A determines whether the identified VLAN is provisioned on the receiving port based on VLAN table 55A included in PFE 52A of access switch 40 (72). For example, PFE 52A may determine whether the identified VLAN is provisioned on the receiving port by performing a lookup in VLAN table 55A based on the VLAN tag and a port number of the receiving port, and based on VLAN table 55A having no entries for the VLAN tag and the port number, PFE 52A may classify the VLAN as not being provisioned on the port.

When the VLAN is provisioned on the receiving port (YES branch of 74), PFE 52A performs a source MAC lookup in MAC table 56A based on the source MAC address and a VLAN index associated with the VLAN tag, and performs packet switching with other PFEs 52 via switch fabric 51 to forward the data packet for the VLAN to its destination (76). For example, PFE 52A may first determine whether the source MAC address of the data packet is known for the VLAN on the port. If the source MAC address is not known, then PFE 52A may perform source MAC address learning for the VLAN on the port. If the source MAC address is already known, then PFE 52A may immediately perform packet switching of the data packet according to FIB 54A in PFE 52A.

When the VLAN is not provisioned on the receiving port (NO branch of 74), PFE 52A initiates the VLAN auto-provisioning operation in accordance with techniques described in this disclosure. PFE 52A first maps the VLAN tag to a shared VLAN index for all unknown VLANs on the port (78). PFE 52A then installs an entry in MAC table 56A including the shared VLAN index, the source MAC address, and a port number of the receiving port (80). The installed entry in MAC table 56A stops PFE 52A from sending additional notifications to control unit 42 based on subsequent data packets received for an unknown VLAN on the same port with the same source MAC address. In addition, PFE 52A may set a learning state bit for the installed entry in MAC table 56A, which causes PFE 52A to drop the subsequent data packets received for an unknown VLAN on the same port with the same source MAC address.

PFE 52A sends a notification to control unit 42 of access switch 40 that the VLAN is not provisioned on the receiving port (82). Upon receipt of the notification from PFE 52A, VLAN authorization unit 48 of control unit 42 authorizes the VLAN for the receiving port based on VLAN configuration information 50 included in control unit 42 (84). For example, VLAN authorization unit 48 may compare the VLAN tag to VLAN configuration information 50 to determine whether the VLAN is expected on the receiving port, and based on the VLAN being expected on the receiving port, VLAN authorization unit 48 may authorize the VLAN for the receiving port.

Once the VLAN is authorized for the receiving port, control unit 42 provisions the VLAN on the receiving port (86). Upon provisioning the VLAN on the receiving port, PFE 52A performs a source MAC lookup in MAC table 56A and packet switching for any subsequent data packets received for the same VLAN on the same port (88). Provisioning the VLAN on the receiving port includes one or more of enabling source MAC address learning for the VLAN on the receiving port, programming forwarding information for the VLAN on the receiving port into FIB 54A of PFE 52A, or initializing VLAN aging to determine when to remove the programmed forwarding information for the VLAN on the port from FIB 54A of PFE 52A when data packets for the VLAN are not received for a period of time. As one example, upon provisioning the VLAN on the receiving port, control unit 42 may initialize age-out timers for source MAC addresses for the VLAN on the port. In this way, each of the source MAC addresses learned for the VLAN on the port may age-out individually when data packets are not received from the respective source MAC address for a period of time. When all of the source MAC addresses for the VLAN on the port have aged-out, control unit 42 initializes a VLAN age-out delay timer, and unprovisions the VLAN on the port after expiration of the VLAN age-out delay timer.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:
1. A method comprising:
receiving, on a port of an access switch in a data center network, a data packet for a virtual local area network (VLAN) from a server, the data packet including a

VLAN tag identifying the VLAN and a source media access control (MAC) address identifying the server;

performing, at a forwarding plane of the access switch, a lookup in a VLAN table in the forwarding plane of the access switch based on the VLAN tag and a port number of the port on which the data packet was received;

based on the VLAN table having no entry for the VLAN tag and the port number, determining, at the forwarding plane of the access switch, that the VLAN of the received data packet is not provisioned on the port of the access switch;

in response to determining that the VLAN of the received data packet is not provisioned on the port of the access switch:

mapping the VLAN tag to a shared VLAN index for all unknown VLANs on the port, performing, at the forwarding plane of the access switch, a lookup in a MAC table in the forwarding plane of the access switch based on the source MAC address and the shared VLAN index, and based on the MAC table having no entry for the source MAC address and the shared VLAN index, sending a notification that the VLAN is not provisioned on the port of the access switch from the forwarding plane of the access switch to a control plane of the access switch;

authorizing, at the control plane of the access switch in response to the notification from the forwarding plane, the VLAN for the port of the access switch based on VLAN configuration information in the control plane of the access switch; and upon authorization of the VLAN, provisioning, with the control plane of the access switch, the VLAN on the port of the access switch.

2. The method of claim 1, further comprising:

based on the MAC table having no entry for the source MAC address and the shared VLAN index, installing an entry in the MAC table in the forwarding plane of the access switch, wherein the installed entry includes the shared VLAN index, the source MAC address, and the port number of the port on which the data packet was received, and wherein the installed entry stops the forwarding plane from sending additional notifications to the control plane based on subsequent data packets received for an unknown VLAN on the same port with the same source MAC address.

3. The method of claim 2, further comprising:

setting a learning state bit for the installed entry in the MAC table; and dropping the subsequent data packets received for an unknown VLAN on the same port with the same source MAC address based on the set learning state bit.

4. The method of claim 1, further comprising, based on the VLAN table having an entry for the VLAN tag and the port number:

determining that the VLAN is provisioned on the port of the access switch;

performing a lookup in the MAC table in the forwarding plane of the access switch based on the source MAC address and a VLAN index assigned to the VLAN on the port;

based on the MAC table having an entry for the source MAC address and the VLAN index, performing packet switching of the data packet according to forwarding information in the forwarding plane; and based on the MAC table having no entry for the source MAC address and the VLAN index, performing source MAC address learning for the VLAN on the port.

5. The method of claim 1, wherein authorizing the VLAN for the port comprises:

comparing the VLAN tag to the VLAN configuration information in the control plane to determine whether the VLAN is expected on the port; and based on the VLAN being expected on the port, authorizing the VLAN for the port.

6. The method of claim 1, wherein provisioning the VLAN on the port comprises at least one of:

enabling source MAC address learning for the VLAN on the port;

programming forwarding information for the VLAN on the port in the forwarding plane; or initializing VLAN aging to determine when to remove the programmed forwarding information for the VLAN on the port from the forwarding plane when data packets for the VLAN are not received for a period of time.

7. The method of claim 1, further comprising, upon provisioning the VLAN on the port:

initializing age-out timers for source MAC addresses for the VLAN on the port;

based on all of the source MAC addresses for the VLAN on the port aging out, initializing a VLAN age-out delay timer; and unprovisioning the VLAN on the port after expiration of the VLAN age-out delay timer.

8. The method of claim 1, wherein the port comprises a server-facing port of the access switch in the data center network.

9. The method of claim 1, further comprising, upon provisioning the VLAN on the port and receiving a subsequent data packet for the VLAN on the port, performing a lookup in the MAC table based on a source MAC address included in the subsequent data packet and a VLAN index assigned to the VLAN on the port, and performing packet switching for the subsequent data packet.

10. The method of claim 1, further comprising:

in response to determining that the VLAN of the received data packet is not provisioned on the port of the access switch, installing an entry in the VLAN table for the VLAN tag and the port number that includes the shared VLAN index; and upon provisioning the VLAN on the port of the access switch, updating the entry in the VLAN table for the VLAN tag and the port number with a VLAN index for the provisioned VLAN.

11. An access switch in a data center network, the access switch comprising:

a control unit including virtual local area network (VLAN) configuration information; and a forwarding engine including a VLAN table, a media access control (MAC) table, and at least one port to receive a data packet for a VLAN from a server, the data packet including a VLAN tag identifying the VLAN and a source media access control (MAC) address identifying the server, wherein the forwarding engine is configured to:

perform a lookup in the VLAN table based on the VLAN tag and a port number of the port on which the data packet was received, based on the VLAN table having no entry for the VLAN tag and the port number, determine that the VLAN of the received data packet is not provisioned on the port of the access switch, and in response to determining that the VLAN of the received data packet is not provisioned on the port of the access switch, map the VLAN tag to a shared VLAN index for all unknown VLANs on the port, perform a lookup in the MAC table based on the source MAC address and the shared VLAN index, and based on the MAC table having no entry for the source MAC address and the shared VLAN index, send a notification that the VLAN is not provisioned on the port of the access switch to the control unit of the access switch, and wherein, in response to the notification from the forwarding engine, the control unit is configured to authorize the VLAN for the port of the access switch based on the VLAN configuration information, and, upon authorization of the VLAN, provision the VLAN on the port of the access switch.

12. The access switch of claim 11, wherein, the forwarding engine is configured to:
based on the MAC table having no entry for the source MAC address and the shared VLAN index, install an entry in the MAC table in the forwarding engine, wherein the installed entry includes the shared VLAN index, the source MAC address, and the port number of the port on which the data packet was received, and wherein the installed entry stops the forwarding engine from sending additional notifications to the control unit based on subsequent data packets received for an unknown VLAN on the same port with the same source MAC address.

13. The access switch of claim 12, wherein the forwarding engine is configured to:
set a learning state bit for the installed entry in the MAC table; and
drop the subsequent data packets received for an unknown VLAN on the same port with the same source MAC address based on the set learning state bit.

14. The access switch of claim 11, wherein the forwarding engine is configured to, based on the VLAN table having an entry for the VLAN tag and the port number:
determine that the VLAN is provisioned on the port of the access switch;
perform a lookup in the MAC table in the forwarding engine based on the source MAC address and a VLAN index assigned to the VLAN on the port;
based on the MAC table having an entry for the source MAC address and the VLAN index, perform packet switching of the data packet according to forwarding information in the forwarding engine; and
based on the MAC table having no entry for the source MAC address and the VLAN index, perform source MAC address learning for the VLAN on the port.

15. The access switch of claim 11, wherein the control unit is configured to:
compare the VLAN tag to the VLAN configuration information in the control unit to determine whether the VLAN is expected on the port; and
based on the VLAN being expected on the port, authorize the VLAN for the port.

16. The access switch of claim 11, wherein the control unit is configured to at least one of:
enable source MAC address learning for the VLAN on the port;
program forwarding information for the VLAN on the port in the forwarding engine; or
initialize VLAN aging to determine when to remove the programmed forwarding information for the VLAN on the port from the forwarding engine when data packets for the VLAN are not received for a period of time.

17. The access switch of claim 11, wherein the control unit is configured to, upon provisioning the VLAN on the port:
initialize age-out timers for source MAC addresses for the VLAN on the port;
based on all of the source MAC addresses for the VLAN on the port aging out, initialize a VLAN age-out delay timer; and
unprovision the VLAN on the port after expiration of the VLAN age-out delay timer.

18. The access switch of claim 11, wherein the port comprises a server-facing port of the access switch in the data center network.

19. The access switch of claim 11, wherein the forwarding engine is configured to, upon the control unit provisioning the VLAN on the port and the forwarding engine receiving a subsequent data packet for the VLAN on the port, perform a lookup in the MAC table based on a source MAC address included in the subsequent data packet and a VLAN index assigned to the VLAN on the port, and perform packet switching for the subsequent data packet received for the same VLAN on the same port.

20. The access switch of claim 11, wherein the forwarding engine is configured to:
in response to determining that the VLAN of the received data packet is not provisioned on the port of the access switch, install an entry in the VLAN table for the VLAN tag and the port number that includes the shared VLAN index; and
upon the control unit provisioning the VLAN on the port of the access switch, update the entry in the VLAN table for the VLAN tag and the port number with a VLAN index for the provisioned VLAN.

21. A non-transitory computer-readable storage medium comprising instructions that when executed cause one or more processors to:
receive, on a port of an access switch in a data center network, a data packet for a virtual local area network (VLAN) from a server, the data packet including a VLAN tag identifying the VLAN and a source media access control (MAC) address identifying the server;
perform, at a forwarding plane of the access switch, a lookup in a VLAN table in the forwarding plane of the access switch based on the VLAN tag and a port number of the port on which the data packet was received;
based on the VLAN table having no entry for the VLAN tag and the port number, determine, at the forwarding plane of the access switch, that the VLAN of the received data packet is not provisioned on the port of the access switch;
in response to determining that the VLAN of the received data packet is not provisioned on the port of the access switch:
map the VLAN tag to a shared VLAN index for all unknown VLANs on the port,
perform, at the forwarding plane of the access switch, a lookup in a MAC table in the forwarding plane of the access switch based on the source MAC address and the shared VLAN index, and
based on the MAC table having no entry for the source MAC address and the shared VLAN index, send a notification that the VLAN is not provisioned on the port of the access switch from the forwarding plane of the access switch to a control plane of the access switch;
authorize, at the control plane of the access switch in response to the notification from the forwarding plane, the VLAN for the port of the access switch based on VLAN configuration information in the control plane of the access switch; and
upon authorization of the VLAN, provision, with the control plane of the access switch, the VLAN on the port of the access switch.

* * * * *